United States Patent
Fan et al.

(10) Patent No.: US 10,855,668 B2
(45) Date of Patent: Dec. 1, 2020

(54) WIRELESS DEVICE AUTHENTICATION AND SERVICE ACCESS

(71) Applicant: Extreme Networks, Inc., San Jose, CA (US)

(72) Inventors: Peng Fan, Hangzhou (CN); Xu Zou, San Jose, CA (US); Wei Song, Hangzhou (CN)

(73) Assignee: Extreme Networks, Inc., San Jose, CA (US)

( * ) Notice: Subject to any disclaimer, the term of this patent is extended or adjusted under 35 U.S.C. 154(b) by 272 days.

(21) Appl. No.: 15/431,622

(22) Filed: Feb. 13, 2017

(65) Prior Publication Data

US 2017/0155641 A1    Jun. 1, 2017

Related U.S. Application Data

(63) Continuation of application No. 14/201,336, filed on Mar. 7, 2014, now Pat. No. 9,628,467.

(60) Provisional application No. 61/799,352, filed on Mar. 15, 2013.

(51) Int. Cl.
*H04L 9/00*    (2006.01)
*H04L 29/06*   (2006.01)

(52) U.S. Cl.
CPC ........ *H04L 63/0815* (2013.01); *H04L 63/062* (2013.01); *H04L 63/0807* (2013.01); *H04L 63/10* (2013.01); *H04L 63/102* (2013.01); *H04L 63/0892* (2013.01)

(58) Field of Classification Search
USPC .......................................................... 726/4
See application file for complete search history.

(56) References Cited

U.S. PATENT DOCUMENTS

| | | | |
|---|---|---|---|
| 5,784,566 A * | 7/1998 | Viavant | G06F 21/31 709/229 |
| 7,536,722 B1 | 5/2009 | Saltz et al. | |
| 8,239,929 B2 * | 8/2012 | Kwan | H04L 63/08 709/201 |
| 8,812,860 B1 | 8/2014 | Bray | |
| 8,990,911 B2 * | 3/2015 | Olden | H04L 63/0815 726/1 |
| 2007/0044143 A1 * | 2/2007 | Zhu | G06F 21/33 726/8 |

(Continued)

OTHER PUBLICATIONS

International Application No. PCT/US2015/018782, International Search Report and Written Opinion dated Jun. 17, 2015.

(Continued)

*Primary Examiner* — Christopher J Brown
(74) *Attorney, Agent, or Firm* — Sterne, Kessler, Goldstein & Fox P.L.L.C.

(57) ABSTRACT

Authenticating a client device coupled to an authenticator network device for a network. A service request is received from the client device at the authenticator network device. User credentials, including a user ID, a user key, and a nonce for a user are received at the authenticator network device. A token is generated using the received user credentials. The service request is modified to include the token and a user ID parameter that is the user ID to generate a modified service request. The modified service request is used to provide single sign-on access to a service that is the subject of the service request.

20 Claims, 7 Drawing Sheets

(56) References Cited

U.S. PATENT DOCUMENTS

| | | | |
|---|---|---|---|
| 2008/0313707 A1* | 12/2008 | Jain | H04L 63/08 |
| | | | 726/2 |
| 2009/0055916 A1* | 2/2009 | McGarvey | H04L 9/3213 |
| | | | 726/8 |
| 2009/0132828 A1 | 5/2009 | Kiester et al. | |
| 2010/0281530 A1 | 11/2010 | Tarkoma | |
| 2011/0159848 A1 | 6/2011 | Pei et al. | |
| 2011/0264913 A1 | 10/2011 | Nikander et al. | |
| 2012/0291114 A1 | 11/2012 | Poliashenko et al. | |

OTHER PUBLICATIONS

European Patent Application No. 15758244.6, Search Report dated Feb. 23, 2017.

\* cited by examiner

WIRELESS DEVICE AUTHENTICATION AND SERVICE ACCESS

CROSS-REFERENCE TO RELATED APPLICATIONS

The present application is a continuation application of U.S. patent application Ser. No. 14/201,336, filed Mar. 7, 2014, which claims priority to U.S. Provisional Patent Application No. 61/799,352, filed Mar. 15, 2013, which are incorporated by reference herein.

BACKGROUND

An area of ongoing research and development is in improving performance of communication over a network, and in particular a wireless network. Wireless networks are frequently governed by 802.11 standards. While not all networks need to use all of the standards associated with 802.11, a discussion of the standards by name, such as 802.11n provides, at least partly because the standards are well-known and documented, a useful context in which to describe issues as they relate to wireless systems.

An important aspect of providing wireless services is in ensuring that the proper devices receive the proper services (e.g. services to which a systems administrator has granted permission). Often, receiving services requires a device be authenticated. Particularly when making use of third party (relative to the party granting wireless access), authentication may be required twice, once when authenticating in accordance with, for example, 802.11 protocols and again when authenticating with the third party service. Reducing the number of authentications would be seen as advantageous if access controls can be maintained at a reasonable level.

The foregoing examples of the related art and limitations related therewith are intended to be illustrative and not exclusive. For example, wireless clients may use different protocols other than 802.11, potentially including protocols that have not yet been developed. However, problems associated with multiple authentications may persist. Other limitations of the relevant art will become apparent to those of skill in the art upon reading the specification and studying of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

The various implementations relate to providing single sign-on access to services for a client device. In at least one of the various implementations, a client device coupled to an authenticator network device is authenticated for a network. In at least one of the various implementations, a service request is received from the client device at the authenticator network device. Further, in at least one of the various implementations, user credentials, including a user ID, a user key, and a nonce for a user are received at the authenticator network device. In at least one of the various implementations, a token is generated using the received user credentials. Additionally, in at least one of the various implementations, the service request is modified to include the token and a user ID parameter that is the user ID to generate a modified service request. In at least one of the various implementations, the modified service request is used to provide single sign-on access to a service that is the subject of the service request.

These and other advantages will become apparent to those skilled in the relevant art upon a reading of the following descriptions and a study of the several examples of the drawings.

DETAILED DESCRIPTION

Figure 1:
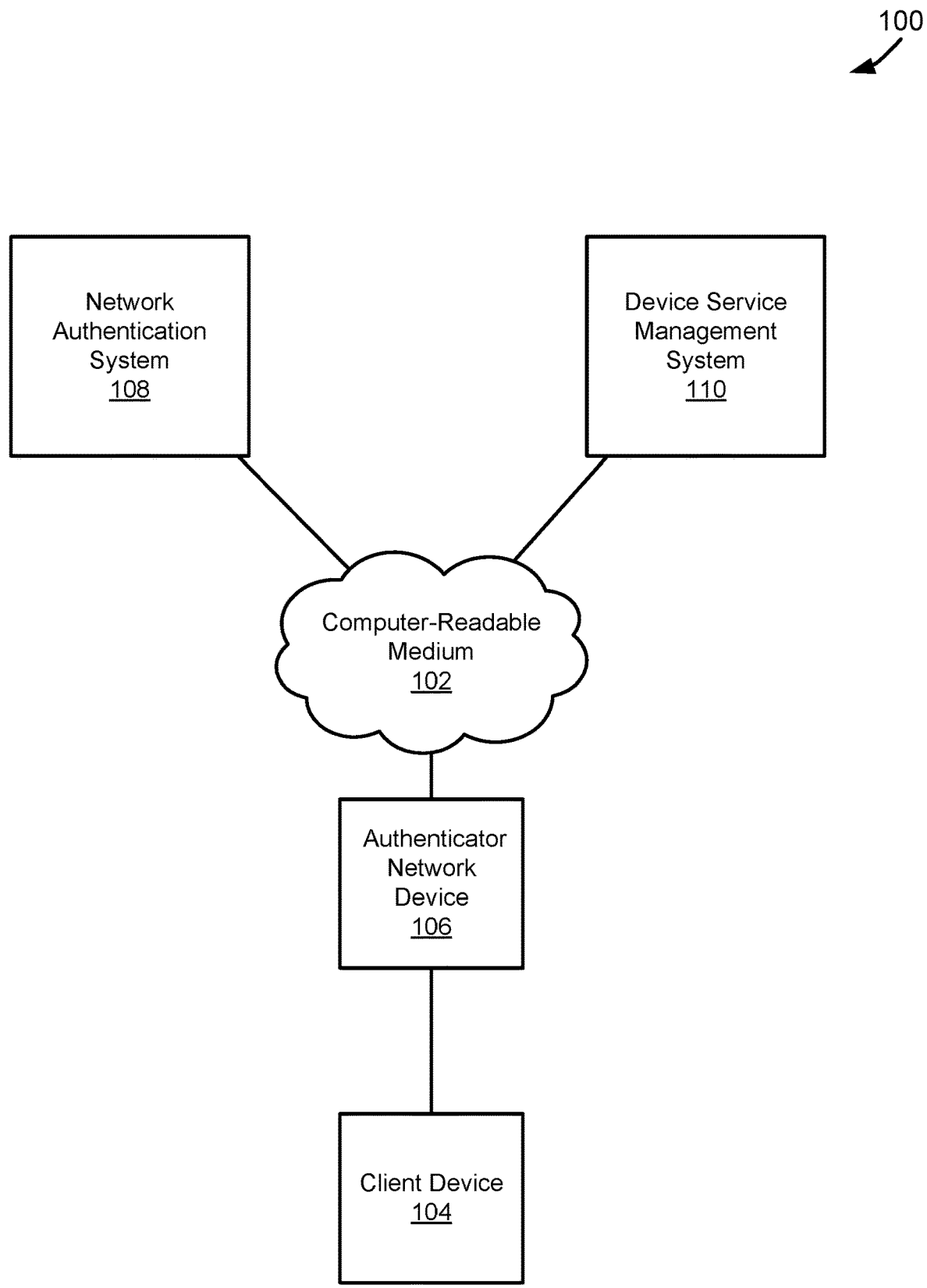
FIG. 1 depicts a diagram of an example of a system for single sign-on authentication of a client device for a network and access for the client device to services provided by the network.

FIG. 1 depicts a diagram 100 of an example of a system for single sign-on authentication of a client device for a network and access for the client device to services provided by the network. The example system shown in FIG. 1 includes a computer-readable medium 102, a client device 104, an authenticator network device 106, a network authentication system 108, and a device service management system 110.

In the example system shown in FIG. 1, the authenticator network device 106, the network authentication system 108, and the device service management system 110 are coupled to each other through the computer-readable medium 102. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102, the client device 104, the authenticator network device 106, the network authentication system 108, the device service management system 110, and other systems, or devices described in this paper can be implemented as a computer system or parts of a computer system or a plurality of computer systems. A computer system, as used in this paper, is intended to be construed broadly and can include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine or through multiple engines. As used in this paper, an engine includes at least two components: 1) a dedicated or shared processor and 2) hardware, firmware, and/or software modules that are executed by the processor. Depending upon implementation-specific, configuration-specific, or other considerations, an engine can be centralized or its functionality distributed. An engine can be a specific purpose engine that includes specific purpose hardware, firmware, or software embodied in a computer-readable medium for execution by the processor. The processor transforms data into new data using implemented data structures and methods, such as is described with reference to the FIGs. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

In the example system shown in FIG. 1, the client device 104 is coupled to the authenticator network device 106. In being coupled to the authenticator 106, the client device 104 can form a LAN or part of a LAN with the authenticator network device 106. In a specific implementation, the client device 104 functions to send and receive data over a network. In sending and receiving data, the client device 104 can send, and receive authentication data used to authenticate the client device 104 on a network. Depending upon implementation-specific, configuration-specific, or other considerations, the client device 104 can be a mobile device, such as a smart phone, PDA, or wearable electronic device; a semi-mobile device, such as a notebook or laptop computer, or other device that is generally considered portable; or a device generally not considered to be mobile, such as a desktop computer. Further depending upon implementation-specific, configuration-specific, or other considerations, the client device 104 can be a thin client device or an ultra-thin client device.

In a specific implementation, the client device 104 is coupled to the authenticator network device 106 through a wireless connection. In the specific implementation, the client device 104 sends and receives data through the authenticator network device 106. For example, the client device 104 can send and receive data to and from the authenticator network device 106 over a wireless connection that couples the client device 104 to the authenticator network device 106. A wireless connection that couples the client device 104 to the authenticator network device may or may not be IEEE 802-compatible. In this paper, IEEE 802 standards terminology is used by way of relatively well-understood example to discuss implementations that include wireless techniques that connect stations through a wireless medium. A station, as used in this paper, may be referred to as a device with a media access control (MAC) address and a physical layer (PHY) interface to a wireless medium that complies with the IEEE 802 standards. Thus, for example, client devices and a network with which the client devices associate can be referred to as stations, if applicable. IEEE 802.1, IEEE 802.3, IEEE 802.11a-1999, IEEE 802.11b-1999, IEEE 802.11g-2003, IEEE 802.11-2007, and IEEE 802.11n TGn Draft 8.0 (2009) are incorporated by reference.

In a specific implementation, in which a wireless connection couples the client device 104 to the authenticator network device 106, applicable devices, systems and engines described in this paper may or may not be IEEE 802 standards-compatible or IEEE 802 standards-compliant. As used in this paper, IEEE 802 standards-compatible or IEEE 802 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative implementations, a station may comply with a different standard than Wi-Fi or IEEE 802.11 and may be referred to as something other than a "station," and may have different interfaces to a wireless or other medium.

In a specific implementation, the authenticator network device 106 functions to couple the client device 104 to a network. Depending upon implementation-specific or other considerations, the authenticator network device 106 can couple the client device 104 to a LAN within a network. In coupling the client device 104 to a network, the authenticator network device 106 can receive data from the client device 104 and send data, received through a network to the client device 104. The authenticator network device 106 can be an applicable device used in connecting a client device to a network. For example, the authenticator network device 106 can be a virtual private network (hereinafter referred to as "VPN") gateway, a router, an access point (hereinafter referred to as "AP"), or a device switch.

In a specific implementation, the authenticator network device 106 functions to generate and transmit authentication data between the network authentication system 108 and the client device 104. Authentication data transmitted by the authenticator network device 106 can be used to authenticate a device in accordance with an applicable standard, such as IEEE 802.1X. Further, authentication data transmitted by the authenticator network device 106 can include requests and responses generated and sent by the network authentication system 108 and the client device 104. Request and response frames transmitted by the authenticator network device 106 can include an identity, e.g. MAC address, of the client device 104 that is being authenticated in a network.

In a specific implementation, the authenticator network device 106 is configured to generate and transmit authentication data that is used to initiate authentication of the client device 104 in a network. For example, the authenticator network device 106 can transmit EAP request frames to and from the client device 104 and the network authentication system 108. Additionally, the authenticator network device 106 can transmit EAP response frames to and from the client device 104 and the network authentication system 108. An EAP response frame transmitted by the authenticator network device 106 can be an EAP response identity frame that includes an identification of the client device 104, such as a MAC address of the client device 104 or a user ID of a user associated with the client device 104.

In a specific implementation, the authenticator network device 106 is configured to generate and transmit authentication data that is used in negotiation and authentication of the client device 104 in a network. For example, the authenticator network device 106 can transmit requests and responses between the network authentication system 108 and the client device 104 used in authenticating the client device 104 in a network, e.g. EAP requests and responses. The network authentication system 108 can transmit authentication data that includes messages used in negotiating and agreeing upon an authentication method, e.g. EAP method requests and responses. Authentication data transmitted by the authenticator network device 106 can include a success message indicating that the client device 104 has been successfully authenticated for a network, e.g. an EAP success message. Additionally, authentication data transmitted by the authenticator network device 106 can include a failure message indicating that the client device 104 has not been successfully authenticated for a network, e.g. an EAP failure message.

In a specific implementation, the authenticator network device 106 functions to manage a port through which the client device 104 is coupled to the authenticator network device 106. In managing a port through which the client device 104 is coupled to the authenticator network device 106, the authenticator network device 106 can set the port to an unauthorized state. The authenticator network device 106 can set a port to an unauthorized state during the time in which a client device 104 is authenticated, e.g. the time between when the client device 104 first connects to the authenticator network device 106 up to when the client device is authenticated for a network by the network authentication system 108. As used herein, a port in an unauthorized state only allows traffic that is used to authenticate a client device to pass through it. For example, if a port that couples the authenticator network device 106 and the client device is set at an unauthorized state, then the authenticator network device 106 can only transmit messages used to authenticate the client device 104, e.g. EAP responses and requests, through the port. Additionally, in managing a port through which the client device 104 is coupled to the authenticator network device 106, the authenticator network device 106 can set a port, through which the client device 104 is coupled to the authenticator network device 106, to an authorized state. As used herein, in setting a port in an authorized state allows all applicable traffic to pass through it. The authenticator network device 106 can set a port to an authorized state after receiving a message indicating that the client device 104 has been authenticated for a network by the network authentication system, e.g. an EAP success message.

In a specific implementation, the authenticator network device 106 functions to encapsulate authentication data that it transmits. The authenticator network device 106 can encapsulate authentication data that is transmitted between network authentication system 108 and the client device 104. Depending upon implementation-specific or other considerations, the authenticator network device 106 can encapsulate authentication data according to the remote authentication dial in user service (hereinafter referred to as "RADIUS") protocol or the diameter protocol. For example, the authenticator network device 106 can receive an identity response from the client device 104 and encapsulate the identity response in a RADIUS access request packet that is transmitted to the network authentication system 108.

In a specific implementation, the network authentication system 108 functions to authenticate the client device 104 for a network. It may be noted that the authenticator network device 106 can also have some authentication capabilities, and the amount of authentication processes that take place on the authenticator network device 106 and the network authentication system 108 can be considered implementation-specific. However, the network authentication system 108 is treated as the sole wireless access authenticator for illustrative convenience.

In a specific implementation, in authenticating the client device 104 for a network, the network authentication system 108 can send and receive authentication data. The network authentication system 108 can send and receive authentication data in accordance with an applicable protocol for authenticating a client device, such as EAP. In sending and receiving authentication data, the network authentication system 108 can send authentication data to the client device 104 through the authenticator network device 106 and receive authentication data from the client device 104 through the authenticator network device 106. In various implementations, as part of authenticating the client device 104, the network authentication system 108 can receive authentication data including an identity of the client device 104, e.g. a MAC address of the client device 104 or a user ID of a user associated with the client device 104. The network authentication system 108 can send and receive authentication data that includes messages used for determining and agreeing upon a method by which the network authentication system 108 will authenticate the client device 104. For example, the network authentication system 108 can send and receive EAP method messages.

In a specific implementation, in authenticating the client device 104, the network authentication system 108 can determine whether the client device 104 is authenticated for a network associated with the network authentication system 108. If the network authentication system 108 authenticates the client device 104 for a network, then it can generate and transmit a success message, e.g. an EAP success message, indicating that the client device 104 has been successfully authenticated for the network. Similarly, if the network authentication system 108 does not authenticate the client device 104 for a network, then it can generate and transmit a failure message, e.g. an EAP failure message, indicating that the client device 104 has not been successfully authenticated for the network.

In a specific implementation, the device service management system 110 functions to provide and manage services for client devices. Depending upon implementation-specific or other considerations, the device service management system 110 can provide and manage access to services for which authorization is required to access the services. Further depending upon implementation-specific or other considerations, the device service management system 110 can provide and manage access to services for which authorization is not required to access the services. Services provided and managed by the device service management system 110 can be from a third party (e.g. other than the supplicant and the network access provider).

In a specific implementation, the device service management system 110 functions to communicate with the authenticator network device 106 in providing and managing services for the client device 104. Depending upon implementation-specific or other considerations, the authenticator network device 106 can communicate with the device service management system 110 using applicable encryption techniques to encrypt the communication. For example, the authenticator network device 106 can obtain a public-key infrastructure (hereinafter referred to as "PKI") certificate from the device service management system 110 to facilitate encrypted communication with the device service management system 110. Other known, applicable, or convenient encryption techniques can also be employed.

In a specific implementation, the authenticator network device 106 functions to generate and send a user credential query message to the device service management system 110. Depending upon implementation-specific or other considerations, the authenticator network device 106 generates and sends a user credential query message to the device service management system 110 after the client device 104 is authorized for a network by the network authentication system 108. Further depending upon implementation-specific or other considerations, the authenticator network device 106 generates and sends a user credential query message to the device service management system 110 after a new service is provisioned to client devices coupled to a network. Still further depending upon implementation-specific or other considerations, the authenticator network device 106 generates and sends a user credential query message to the device service management system after receiving a service request from a client device. A user credential query message sent by the authenticator network device 106 can include a MAC address of the client device 104.

In a specific implementation, the device service management system 110 functions to send user credentials to the authenticator network device 106. User credentials sent by the device service management system 110 to the authenticator network device 106 can include a user key, user ID, and a user sequence number, number string, or nonce. The device service management system 110 can send user credentials to the authenticator network device 106 in response to receiving a user credential query message from the authenticator network device 106. In sending user credential to the authenticator network device 106, the device service management system 110 can search for user credentials using a MAC address of the client device 104, included as part of a user credential query message.

In a specific implementation, the authenticator network device 106 functions to generate a token for a user associated with the client device 104. In generating a token, the authenticator network device 106 can generate a body in plain text that includes user credentials, e.g. a user identity, nonce and user key, received from the device service management system 110. Further, in generating a token, the authenticator network device 106 can encrypt a body in plain text that includes user credentials with a user key. The authenticator network device 106 can encode an encrypted body using an applicable encoding scheme, such as Base64.

In a specific implementation, the authenticator network device 106 functions to receive service requests from the client device 104. Further in the specific implementation, the authenticator network device 106 functions to modify service requests received from the client device 104 to include a generated token and transit the modified service requests to the device service management system 110. A token included in a service request modified by the authenticator network device can be generated in an applicable manner, such as the manner described in the preceding paragraph. Service requests received and modified by the authenticator network device 106 can include enrollment requests that specify a desire to enroll in a service provided by the device service management system 110. Additionally, service requests received and modified by the authenticator network device 106 can include use requests that specify a desire to use a service provided by the device service management system 110. Depending upon implementation-specific or other considerations, the authenticator network device 106 can receive and modify HTTP service requests. In modifying a service request, the authenticator network device 106 can insert a token as a parameter in the service request to create a modified service request. Further, in modifying a service request, the authenticator network device 106 can modify a received service request to include a generated token specific to a user associated with the client device from which the service request is received. The authenticator network device 106 can modify a received service request by adding other parameters, such as a user id of a user associated with a client from which the service request is received. An example of an HTTP service request modified by the authenticator network device 106 is as follows, http://www.example.com/enrollment?id=user-id &token=user-token. After modifying a received service request, the authenticator network device 106 can transmit the modified service request to the device service management system 110.

In a specific implementation, the device service management system 110 functions to determine a user who initiated a service request from a received modified service request. In determining a user who initiated a service request, the device service management system 110 can decode a token included as part of a modified service request. The device service management system 110 can decode a token through an applicable cryptographic technique, e.g. using Base64. In decoding a token, the device service management system 110 can use a user key to extract plain text from the token. The device service management system 110 can determine a nonce and a user ID included as part of extracted plain text.

In a specific implementation, the device service management system functions to determine whether a user ID determined from plain text extracted from a token is valid. In determining whether a user ID is valid, the device service management system 110 can compare a nonce (either or both a user nonce or a service nonce) determined from plain text extracted from a token to a reference nonce for integration checking and token validity determination. For example, if a locally stored reference nonce is not the same as a nonce determined from plain text extracted from a token in a modified service request, then the device service management system 110 can determine that the token is not valid. Similarly, if a locally stored reference nonce is the same as a nonce determined from plain text extracted from a token in a modified service request, then the device service management system 110 can determine that the token is valid. If a token is determined to be valid, then the device service management system 110 can determine that a user ID determined from plain text extracted from a token of a modified service request is valid.

In a specific implementation, the device service management system 110 functions to manage use of a service. In managing use of a service, the device service management system 110 can determine whether a user of the client device 104 is authorized to use a service. The device service management system 110 can use a token in a modified service request to determine whether a user of the client device 104 is authorized to use a service that is the subject of the modified service request. In using a token in a modified service request to determine whether a user of the client device 104 is authorized to use a service, single sign-on use is achieved, whereby the user does not have to input their credentials to use a service after being authenticated for a network. Further in using a token in a modified service request to determine whether a user of the client device 104 is authorized to use a service, the device service management system 110 can determine a user ID from a modified service request. The device service management system 110 can use a user ID determined from a modified service request, to determine whether a user is authorized to access a service that is a subject of the modified service request. For example, the device service management system 110 can utilize an authorization table that lists all services that a particular user with a user ID are authorized to use to determine what services a user is authorized to use. In managing use of a service, the device service management system 110 can send data to authenticator network device 106, that the client device 104 can exploit in using the service.

In a specific implementation, the device service management system 110 functions to enroll a user of the client device 104 to gain the right to use a service. In enrolling a user of the client device 104, the device service management system 110 can use a token in a modified service request that is an enrollment request. In using a token to enroll a user, single sign-on enrollment is achieved, whereby the user does not have to input their credentials again to be authorized to use a service after begin authenticated for a network. Further in using a token in a modified service request to enroll a user of the client device 104, the device service management system 110 can determine a user ID from a token in a modified service request. Additionally, the device service management system 110 can use a user ID determined form a token in a modified service request to enroll a user associated with the user ID by signifying that the user is authorized to use a service. For example, the device service management system 110 can update or create an entry in an authorization table using the user ID to reflect that a user is authorized to use a service.

In an example of operation of the example system shown in FIG. 1, the client device functions to send and receive data through the authenticator network device. In the example of operation, the network authentication system 108 functions to authenticate the client device 104 for a network. Further in the example of operation, the authenticator network device 106 transmits authentication data between the network authentication system 108 and the client device 104. In the example of operation, the authenticator network device 106 generates and sends a user credential query message to the device service management system. Additionally, in the example of operation, the device service management system 110 sends user credentials, including a user key, a user ID, and a nonce, to the authenticator network device 106. In the example of operation, the authenticator network device 106 generates a token using user credentials received from the device service management system 110.

In the example of operation, the authenticator network device 106 functions to receive requests, including requests to use or become enrolled in a service, from the client device 104. Further in the example of operation, the authenticator network device 106 modifies received service requests to create modified service requests that include a generated token and a user ID of a user from which the request originated. In the example of operation, the authenticator network device 106 sends a modified service request to the device service management system 110. Additionally, in the example of operation, the device service management system 110 uses a token in a modified service request to determine a user ID. In the example of operation, the device service management system 110 determines whether a user is authorized to use a service or enroll a user to gain access to use a service based on a user ID determined from a modified service request. Further in the example of operation, the device service management system 110 provides a service to a user, if it determines that the user has the right to access the service.

Figure 2:
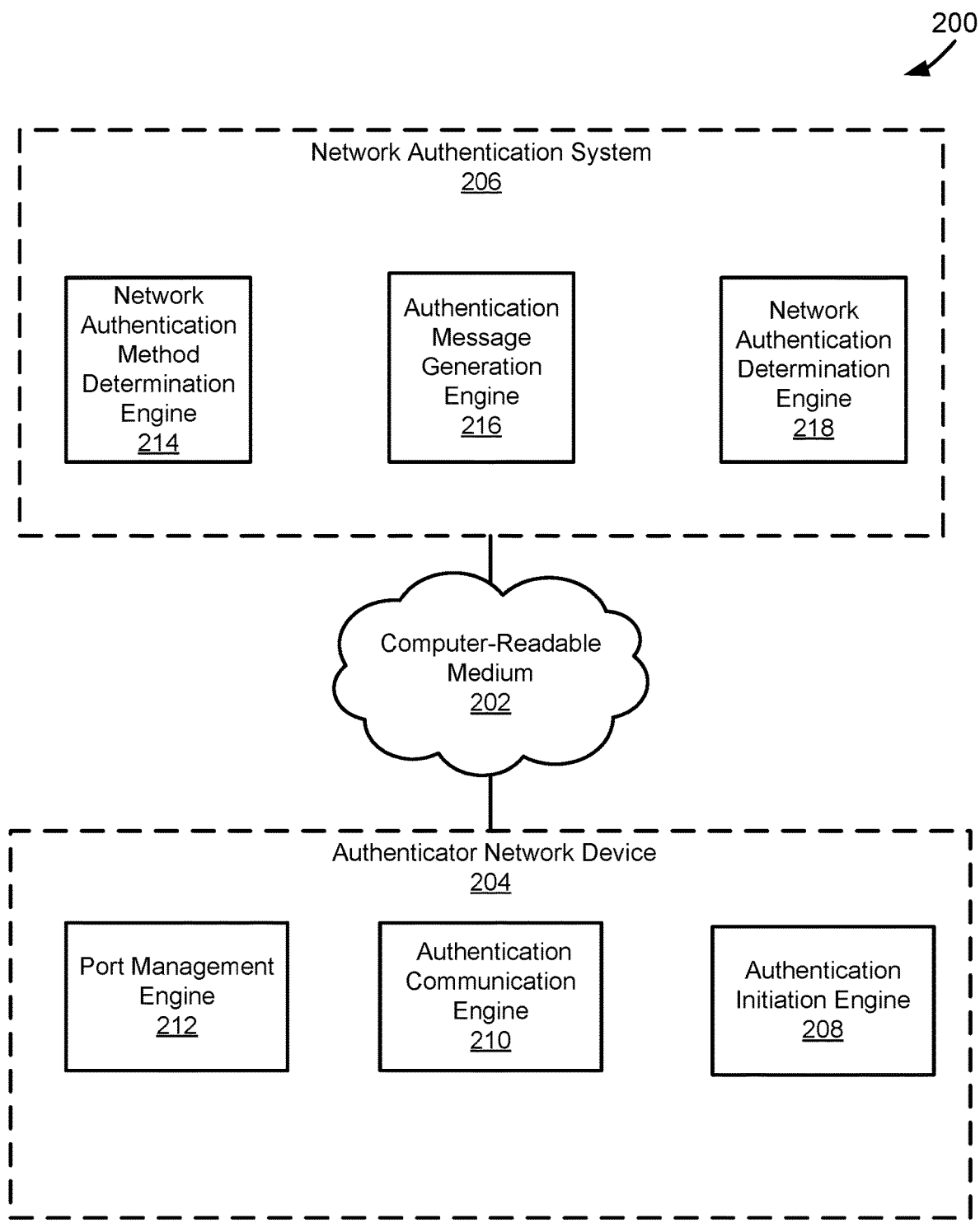
FIG. 2 depicts a diagram of an example of a system for authorizing a client device for a network with a device used in accessing services for the client device.

FIG. 2 depicts a diagram 200 of an example of a system for authorizing a client device for a network with a device used in accessing services for the client device. The example system shown in FIG. 2 includes a computer-readable medium 202, an authenticator network device 204, and a network authentication system 206. The authenticator network device 204 and the network authentication system 206 are coupled to each other through the computer-readable medium 202.

In a specific implementation, the authenticator network device 204 functions according to an applicable device for providing access to a network and services through the network to a client device, such as the authenticator network devices described in this paper. In providing access to a network, the authenticator network device 204 can function to transmit authentication data that is used to authenticate a client device coupled to the authenticator network device 204 for a network. In providing services through the network, the authenticator network device 204 can function to transmit requests, including requests to access a service or enroll in a service, and data associated with using a service, to a client device coupled to the authenticator network device 204. Additionally, the authenticator network device can provide access to services such that a user of a client device does not have to input user credentials to gain access to and use services after the client device has been authenticated for the network.

In a specific implementation, the network authentication system 206 functions according to an applicable system for authorizing a client device for a network, such as the network authentication systems described in this paper. The network authentication system 206 can receive, generate, and send authentication data that is used to authenticate a client device. Specifically, the network authentication system 206 can send authentication to and receive authentication data from a client device through the authenticator network device 204.

In the example system shown in FIG. 2, the authenticator network device 204 includes an authentication initiation engine 208, an authentication communication engine 210, and a port management engine 212. In a specific implementation, the authentication initiation engine 208 functions to initiate authentication for a network of a client device that is coupled to the authenticator network device 204. In initiating authentication of a client device, the authentication initiation engine 208 can determine whether a client device that is coupled to the authenticator network device 204 is authenticated for a network. If it is determined that a client device is not authenticated for a network, the authentication initiation engine 208 can generate and an identity request for the client device. For example, the authentication initiation engine 208 can send an EAP request identity frame to a client device that it determines is not authenticated for a network.

In a specific implementation, the authentication communication engine 210 functions to send authentication data to and receive authentication data from a client device coupled to the authenticator network device 204. The authentication communication engine 210 can send an identity request generated by the authentication initiation engine 208 to a client device to initiate authentication of the client device. The authentication communication engine 210 can receive a response to an identity request message from a client device. For example, the authentication communication engine 210 can receive an EAP response identity frame from a client device that includes an identity of the client device. Additionally, the authentication communication engine 210 can send authentication data received from the network authentication system 206 to a client device coupled to the authenticator network device 204. For example, the authentication communication engine 210 can send EAP requests and responses from the network authentication system 206 to a client device that are used in authenticating the client device in a network. Authentication data sent by the authentication communication engine 210 to a client device can relate to determining a method by which the client device will be authenticated. For example, the authentication communication engine 210 can send EAP requests and responses to a client device that are used in agreeing on an EAP method by which the client device will be authenticated in a network.

In a specific implementation, the authentication communication engine 210 functions to determine an identity of a client device coupled to the authentication communication engine 210 from authentication data received from the client device. For example, the authentication communication engine 210 can determine a MAC address of a client that is included in a frame of a request or response sent from the client. Depending upon implementation-specific or other considerations, the authentication communication engine 210 can store a copy of an identification of a client device locally at the authenticator network device 204. Further depending upon implementation-specific or other considerations, the authentication communication engine 210 can store at the authenticator network device 204 a copy of an identification of a client device with an identification of a port through which the authentication communication engine 210 transmits data to and from the client device. For example, the authentication communication engine 210 can update a forwarding table maintained at the authenticator network device 204 to include a MAC address of a client device and a port through which data is transmitted to and from the client device.

In a specific implementation, the authentication communication engine 210 functions to send authentication data to and receive authentication data from the network authentication system 206. The authentication communication engine 210 can send authentication data, e.g. requests and responses, that are received from a client device coupled to the authenticator network device 204 to the network authentication system 206. For example, the authentication communication engine 210 can send EAP requests and responses received from a client device to the network authentication system. In another example, the authentication communication engine 210 can send an identity response, generated by a client device in response to an identity request, to the network authentication system 206. Authentication data sent by the authentication communication engine 210 to the network authentication system 206 can relate to determining a method by which a client device coupled to the authenticator network device 204 will be authenticated. For example, the authentication communication engine 210 can send EAP requests and responses to the network authentication system 206 that are used in agreeing on an EAP method by which a client device will be authenticated in a network.

In a specific implementation, the port management engine 212 functions to manage ports through which client devices are coupled to the authenticator network device 204. Depending upon implementation-specific or other considerations, the port management engine 212 can manage wired or wireless ports through which client devices are coupled to the authenticator network device 204. In managing a port, a port management engine 212 can set a port to an unauthorized state. For example, a port management engine 212 can set a port to an unauthorized state when a client device that is not authenticated for a network is coupled to the authenticator network device 204 through the port. Additionally, in managing a port, the port management engine 212 can set a port to an authorized state. For example, the port management engine 212 can set a port to an authorized state when a client device that is authenticated for a network is coupled to the authenticator network device 204 through the port. The port management engine 212 can also set a port to an authorized state after receiving a success message, e.g. an EAP success message, from the network authentication system indicating that a client device coupled to the port has been authenticated for a network.

In a specific implementation, the authentication communication engine 210 functions to encapsulate authentication data that is sent to appropriate recipients, e.g. the network authentication system 206 or a client device. Depending upon implementation-specific or other considerations, the authentication communication engine 210 can encapsulate authentication data according to the RADIUS protocol or the diameter protocol. For example, the authentication communication engine 210 can receive an identity response from a client device coupled to the authenticator network device 204 and encapsulate the identity response in a RADIUS access request packet.

The network authentication system 206 includes a network authentication method determination engine 214, an authentication message generation engine 216, and a network authentication determination engine 218. In a specific implementation, the network authentication method determination engine 214 functions to determine an applicable authentication method used to authenticate a client device coupled to the authenticator network device 204. Examples of applicable authentication methods include, one-time-password (hereinafter referred to as "OTP") authentication, or a mutual authentication method. The network authentication method determination engine 214 can determine an authentication method after receiving a response from a client device indicating a rejection of a previously determined authentication method. For example, the network authentication method determination engine 214 can receive a response that indicates a rejection to authenticate using authentication method A and determine a new authentication method as a result.

In a specific implementation, the authentication message generation engine 216 functions to generate messages used to authenticate a client device coupled to the authenticator network device 204. Messages generated by the authentication message generation engine 216 can include requests and responses that include authentication data used to authenticate a client device coupled to the authenticator network device 204. The authentication message generation engine 216 can generate a request or response indicating an authentication method, e.g. EAP method response or request, based on an authentication method determined by the network authentication method determination engine 214 For example, if the network authentication method determination engine 214 determines to use authentication method A to authenticate a client device, then the response generation engine 216 can generate a request that indicates authentication method A as the method by which the client device will be authenticated. The authentication message generation engine 216 can send generated messages to the authenticator network device, where the messages can be sent, and possible encapsulated, by the authentication communication engine 210 to a client device.

In a specific implementation, the network authentication determination engine 218 functions to authenticate a client device for a network based on authentication data, including requests and responses received from the client device through the authenticator network device 204. Specifically, the network authentication determination engine 218 can determine whether a client device should be authenticated for a network according to an agreed upon authentication method based on authentication data received from the client device.

In a specific implementation, the authentication message generation engine 216 generates a method according to whether the network authentication determination engine 218 authenticates a client device for a network. For example, the authentication message generation engine 216 can generate a success message, e.g. EAP response, if the network authentication determination engine 218 authenticates a client device for a network. Alternatively, the authentication message generation engine 216 can generate a failure message, e.g. EAP response, if the network authentication determination engine 218 does not authenticate a client device. Messages generated by the authentication message generation engine 216 according to whether the network authentication determination engine 218 authenticates a client device for a network are sent to the authenticator network device.

In an example of operation of the example system shown in FIG. 2, the authentication initiation engine determines whether a client device coupled to the authenticator network device 204 is authenticated for a network. In the example of operation, if it is determined that the authenticator network device is not authenticated for a network, the authentication initiation engine 208 generates an identity request. Further in the example of operation, the authentication communication engine 210 sends a generated identity request to a client device coupled to the authenticator network device 204. In the example of operation, the port management engine 212 sets a port through which the unauthorized client device is coupled to the authenticator network device to an unauthorized state. Additionally, in the example of operation, the authentication communication engine encapsulates an identity response received from a client device and transmits the encapsulated identity response to the network authentication system 206. In the example of operation, the authentication communication engine 210 transmits authentication data that is used to authenticate a client device between the client device and the network authentication system 206.

In the example of operation, the network authentication method determination engine 214 determines a method to be used in authenticating a client device for a network. Further in the example of operation, the authentication message generation engine 216 generates a message that includes an authentication method determined by the network authentication method determination engine 214. In the example of operation, the network authentication determination engine 218 determines whether to authenticate a client device for a network according to an authentication method determined by the network authentication method determination engine 214 and authentication data received from the client device through the authenticator network device 204. Additionally, in the example of operation, the authentication message generation engine 216 generates and sends a success message or failure message based on whether the network authentication determination engine 218 authenticates a client device for a network.

Figure 3:
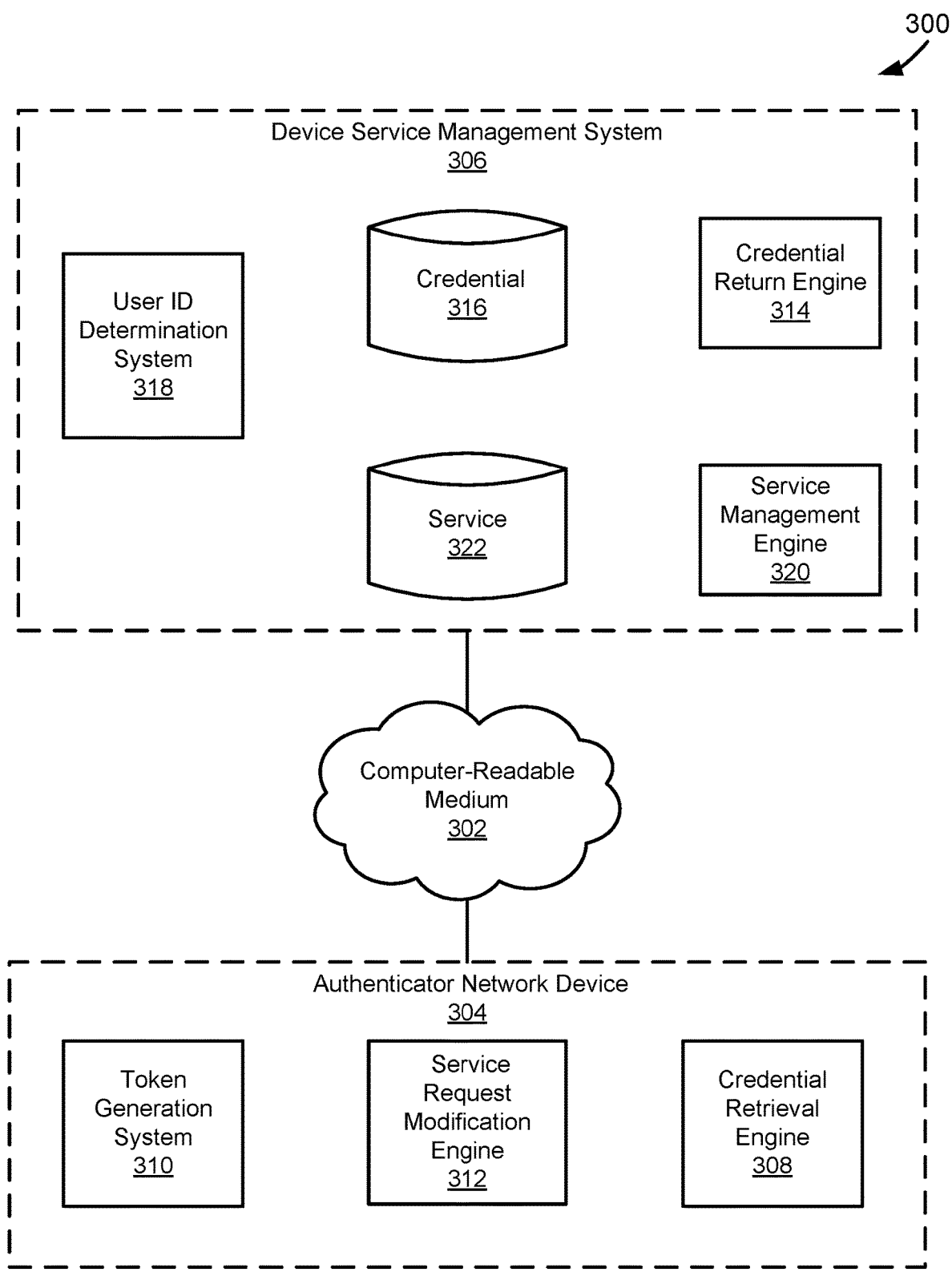
FIG. 3 depicts a diagram of an example of a system for providing single-sign on access to services.

FIG. 3 depicts a diagram 300 of an example of a system for providing single-sign on access to services. The example system shown in FIG. 3 includes a computer-readable medium 302, an authenticator network device 304, and a device service management system 306. In the example system shown in FIG. 3, the authenticator network device 304 and the device service management system 306 are coupled to each other through the computer-readable medium 302.

In a specific implementation, the authenticator network device 304 functions according to an applicable device for providing access to a network and services through the network, such as the authenticator network devices described in this paper. In providing access to a network, the authenticator network device 304 can transmit authentication data between a client device coupled to the authenticator network device 304 and the device service management system 306. In providing access to services through a network, the authenticator network device 304 can transmit service requests, including use requests and enrollment requests, and data that enables a user to use a service between the device service management system 306 and a client device.

In a specific implementation, the device service management system 306 functions according to an applicable system for managing client device access to services in a network, such as the device service management systems described in this paper. The device service management system 306 can provide access to services in a single sign-on manner after a client device is authenticated for a network. For example, the device service management system 306 can provide single sign-on use of services. In another example, the device service management service can provide single sign-on enrollment for enrolling a user of a client device.

In the example system shown in FIG. 3, the authenticator network device 304 includes a credential retrieval engine 308, a token generation system 310, and a service request modification engine 312. In a specific implementation, the credential retrieval engine 308 functions to retrieve user credentials from the device service management system 306. User credentials retrieved by the credential retrieval engine 308 can include a user key, user ID, and a user sequence number, number string, or nonce. The credential retrieval engine 308 can retrieve user credentials of a user associated with a client device coupled to the authenticator network device 304. For example, the credential retrieval engine 308 can retrieve user credentials of a user associated with a client device after a service request, e.g. user request or enrollment request, is received by the authenticator network device from the client device.

In a specific implementation, the credential retrieval engine can generate and send a user credential query message to the device service management system 306 to retrieve credentials. A user credential query message generated and sent by the credential retrieval engine, can include an identifier, e.g. MAC address, of a client device associated with a user for whom user credentials are retrieved. Depending upon implementation-specific or other considerations, the credential retrieval engine 308 can determine a client device identifier from a request received from the client device. For example, a service request can include a MAC address of a client device that sends the service request. Further depending upon implementation-specific or other considerations, the credential retrieval engine 308 can determine a client device identifier from a copy of the client device identifier stored locally on the authenticator network device 304. In retrieving user credentials, the credential retrieval engine 308 can receive user credentials from the device service management system 306 based on a user credential query message sent to the device service management system 306.

In a specific implementation, the token generation system 310 functions to generate a token for a specific user. The token generation system 310 can generate a token for a specific user based on user credentials for the specific user retrieved from the credential retrieval engine 308. In generating a token, the token generation system can generate a body in plain text that includes user credentials, e.g. a user identity and nonce, retrieved by the credential retrieval engine 308. Further, in generating a token, the token generation system 310 can encrypt a body in plain text that includes user credentials with a user key. The token generation system 310 can encode an encrypted body using an applicable encoding scheme, such as Base64.

In a specific implementation, the service request modification engine 312 functions to modify a service request received by the authenticator network device 304 to include a token generated by the token generation system 310. The service request modification engine 312 can modify service request received from a client device coupled to the authenticator network device 304. In modifying service requests to create modified service requests, the service request modification engine 312 can modify a service request to include a token specific to a user associated with a client device from which the service request is received. For example, the service request modification engine 312 can add a token as a parameter in a service request to create a modified service request. Depending upon implementation-specific or other considerations, the service request modification engine 312 can add other parameters, such as a user id, user id parameter, of a user associated with a client device from which a service request is received, in order to create a modified service request. The service request modification engine 312 can send modified requests to the device service management system 306.

In the example system shown in FIG. 3, the device service management system 306 includes a credential return engine 314, a credential datastore 316, a user ID determination system 318, a service management engine 320, and a service datastore 322. In a specific implementation, the credential return engine 314 functions to return user credentials to the credential retrieval engine 308. The credential return engine 314 can return user credentials stored in the credential datastore 316 to the credential retrieval engine 308 based on a user credential query message received from the credential retrieval engine 308. In determining user credentials to return to the credential retrieval engine 308 based on a user credential query message, the credential return engine 314 can utilize a client device identifier included as part of the user credential query message. For example, the credential return engine 314 can use a MAC address of a client device to look up and return user credentials of a user associated with the client device in the credential datastore 316.

In a specific implementation, the user ID determination system 318 functions to determine a user ID from a token included in a modified service request received from the service request modification engine 312. In determining a user ID from a modified service request, the user ID determination system 318 can decode a token included as part of the modified service request. The user ID determination system 318 can decode a token through an applicable cryptographic technique, e.g. using Base64. In decoding a token, the user ID determination system 318 can use a user key to extract plain text from the token. The user ID determination system 318 can determine a nonce and a user ID from plain text extracted from a token.

In a specific implementation, the user ID determination system 318 functions to determine the validity of a user ID determined from plain text extracted from a token in a modified service request. In determining the validity of a user ID, the user ID determination system 318 compares a nonce (either or both a user nonce or a service nonce) determined from plain text extracted from a token to a reference nonce for integration checking and token validity determination. A reference nonce can be stored in the credential datastore 316 along with a user ID of a user that the reference nonce is associated. In the specific implementation, if a reference nonce 316 associated with a user, identified by the user ID, is not the same as a nonce determined from plain text extracted from a token in a modified service request, then the user ID determination system 318 can determine that the token is not valid. Similarly, if a reference nonce 316 associated with a user, identified by the user ID, is the same as a nonce determined from plain text extracted from a token in a modified service request, the user ID determination system 318 can determine that the token is valid. If a token is determined to be valid, then the user ID determination system 318 can determine that a user ID determined from plain text extracted from a token of a modified service request is valid.

In a specific implementation, the service management engine 320 functions to manage use of a service using a user ID determined by the user ID determination system 318. In managing use of a service using a user ID, the service management engine 320 can determine whether a user identified by a user ID is authorized to use a service. Additionally in managing use of a service using a user ID, the service management engine 320 can determine whether a user identified by a user ID is authorized to use a service that is the subject of received modified service request. In determining whether a user is authorized to use a service, the service management engine 320 can use service authorization data stored in the service datastore 322. Authorization data stored in the service datastore 322 can include all services that a user identified by a specific user ID are authorized to use. For example, service authorization data stored in the service datastore 322 can include an authorization table with fields including a user ID and the services that a user indicated by a user ID are authorized to use. In managing user of a service, the service management engine 320 can transmit data or facilitate the transmission of data to the authenticator network device that is used by the client device in using a service.

In a specific implementation, the service management engine 320 functions to enroll a user in a service based on a user ID determined by the user ID determination system 318. In enrolling a user, the service management engine 320 can update service authorization data, such as an authorization table, stored in the service datastore 322 to reflect that a user is authorized to use a service. For example, the service management engine 320 can update or create an entry in an authorization table that includes a user ID and the service that a user identified by the user ID is authorized to use.

In an example of operation of the example system shown in FIG. 3, the credential retrieval engine 308 generates and sends a user credential query message to the device service management system to the device service management system 306 based on a service request received by the authenticator network device 304. Further in the example of operation, the credential return engine 314 returns credentials stored in the credential datastore 316 to the credential retrieval engine 308 based on the user credential query message. In the example of operation, the token generation system 310 generates a token based on user credentials received by the credential retrieval engine 308 from the credential return engine 314. Still further in the example of operation, the service request modification engine 312 modifies a received service request using the token generated by the token generation system 310.

In the example of operation, the user ID determination system 318 determined a user ID from a token included as part of a service request modified by the service request modification engine 312. Further in the example of operation, the service management engine 320 manages access to services based on a user ID determined by the user ID determination system and service authorization data stored in the service datastore 322. In the example of operation, in managing access to services, the service management engine 320 enrolls a user indicated by a user ID in a service. Additionally, in the example of operation, in managing access to services, the service management engine 320 determines whether a user is authorized to use a service. In the example of operation, in managing access to services, the service management engine 320 transmits data or facilitates the transmission of data used by a client device in using a service.

Figure 4:
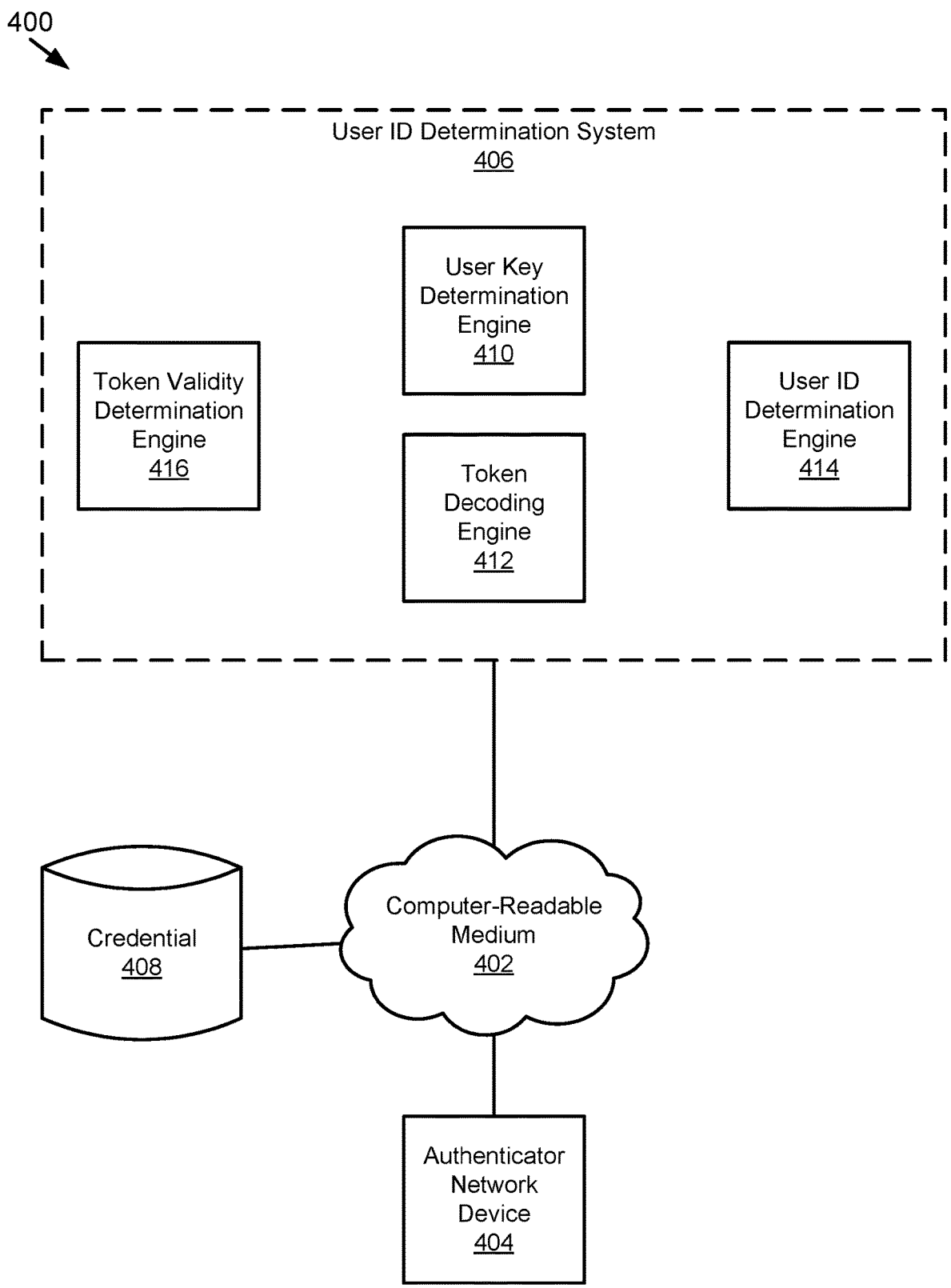
FIG. 4 depicts a diagram of an example of a system for determining a user ID from a token.

FIG. 4 depicts a diagram 400 of an example of a system for determining a user ID from a token. In various implementations, the system shown in FIG. 4 can be used in single sign-on access to services. The example system shown in FIG. 4 includes a computer-readable medium 402, an authenticator network device 404, a user ID determination system 406, and a credential datastore 408. In the example system shown in FIG. 4, the authenticator network device 404, the user ID determination system 406, and the credential datastore 408 are coupled to each other through the computer-readable medium 402.

In a specific implementation, the authenticator network device 404 functions according to an applicable system for authenticating a client device in a network and for access to services, such as the authenticator network devices described in this paper. The authenticator network device 404 can transmit authentication data that is used to authenticate a client device for a network. The authenticator network device 404 can also modify service requests from a client device and transmit modified service requests to the user ID determination system. In modifying service requests, the authenticator network device 404 can add user credentials into a service request to create a modified service request. For example, the authenticator network device 404 can add a token and a user ID into parameters of a service request to create a modified service request.

In a specific implementation, the user ID determination system 406 functions according to an applicable system for determining a user, such as the user ID determination systems described in this paper. The user ID determination system 406 can determine a user ID of a specific user that initiated a service request from a modified service request received from the authenticator network device 404. A user ID determined by the user ID determination system 406 can be used for single sign-on access to services for a user. For example, a user ID determined by the user ID determination system 406 can be used for single sign-on use of a service by a user. In another example, a user ID determined by the user ID determination system 406 can be used for single sign-on enrollment in a service for a user.

In a specific implementation, the credential datastore 408 functions according to an applicable datastore for storing user credentials, such as the credential datastores described in this paper. User credentials stored in the credential datastore 408 can include a user key, a user ID, and a nonce, that are unique to a specific user. A user key and a nonce can be stored in the credential datastore 408 according to a user ID that the user key and the nonce are associated. For example, a user key and a nonce can be stored in an entry in a table along with a user ID of which the user key and the nonce are associated. Depending upon implementation-specific or other considerations, the authenticator network device 404 can use user credentials stored in the credential datastore 408 to modify a service request in creating a modified service request.

In the example system shown in FIG. 4, the user ID determination system 406 includes a user key determination engine 410, a token decoding engine 412, a user ID determination engine 414, and a token validity determination engine 416. In a specific implementation, the user key determination engine 410 functions to determine a user key from a modified service request received from the authenticator network device 404. In determining a user key, the user key determination engine 410 can determine a user ID from a user ID that is inserted as a parameter, e.g. user ID parameter that is the user ID, in a modified service request. The user key determination engine 410 can use a user ID to look up and retrieve a user key that is associated with the user ID. Specifically, the user key determination engine 410 can look up and retrieve a user key associated with a user ID stored in the credential datastore 408.

In a specific implementation, the token decoding engine 412 functions to decode a token included as part of a modified service request received from the authenticator network device 404. The token decoding engine 412 can decode a token included as part of a modified service request using an applicable decryption technique, such as Base64.

In a specific implementation, the user ID determination engine 414 functions to determine a user ID from a token included as part of a modified service request and decoded by the token decoding engine 412. In determining a user ID from a token, the user ID determination engine 414 can use a user key determined by the user key determination engine 410 to decrypt the token. For example, if a modified service request includes user ID A as a parameter, then the user ID determination engine 414 can use user key A associated with user ID A, as determined by the user key determination engine 410, to decrypt a token included in the modified service request. In decrypting a token, the user ID determination engine 414 can function to extract plain text from the token. The user ID determination engine 414 can determine a user ID and a user nonce from plain text extracted from a token as a result of decrypting the token. A user ID determined from plain text extracted form a token can be the user ID that is determined by the user ID determination engine 414.

In a specific implementation, the token validity determination engine 416 functions to determine a validity of a token included as part of a modified service request received from the authenticator network device 404. In determining the validity of a token, the token validity determination engine 416 can use a user ID and a nonce. In one example, a user ID and a nonce used by the token validity determination engine 416 to determine the validity of a token are determined by the user ID determination engine 414 from plain text extracted from the token. In another example, a user ID used by the token validity determination engine 416 to determine the validity of a token is included as a user ID parameter in the token, and a nonce used to determine the validity of the token is determined by the user ID determination engine 414 from plain text extracted from the token. In determining the validity of a token, the token validity determination engine 416 can compare a nonce determined by the user ID determination engine 414 from extracted plain text of the token, to a reference nonce stored in the credential datastore 408. Depending upon implementation-specific or other considerations, a reference nonce stored in the credential datastore 408 is a nonce that is returned to the authenticator network device 404 based on a user credential query message. In determining the validity of a token, the user ID determination engine 414 can use a user ID, either or both included as a user ID parameter or determined from plain text extracted from the token, to determine a reference nonce. Specifically, the token validity determination engine 416 can use a user ID to determine a nonce stored in the credential datastore 408 that is associated with the user ID and therefore serves as a reference nonce. If a nonce determined by the user ID determination engine 414 does not match a reference nonce in the credential datastore 408, then the token validity determination engine 416 can determine that a token, from which the user ID determination engine 414 determines the nonce, is not valid. Similarly, if a nonce determined by the user ID determination engine 414 does match a reference nonce in the credential datastore 408, then the token validity determination engine 416 can determine that a token, from which the user ID determination engine 414 determines the nonce, is valid.

In a specific implementation, the user ID determination engine 414 can determine a user ID from a token based on whether the token validity determination engine 416 determines that a token is valid. Specifically, if the token validity determination engine 416 determines that a token is valid, then the user ID determination engine 414 can determine that a user ID determined from plain text extracted from the token is valid. Similarly, if the token validity determination engine 416 determines that a token is invalid, then the user ID determination engine 414 can determine that a user ID determined from plain text extracted from the token is invalid.

Figure 5:
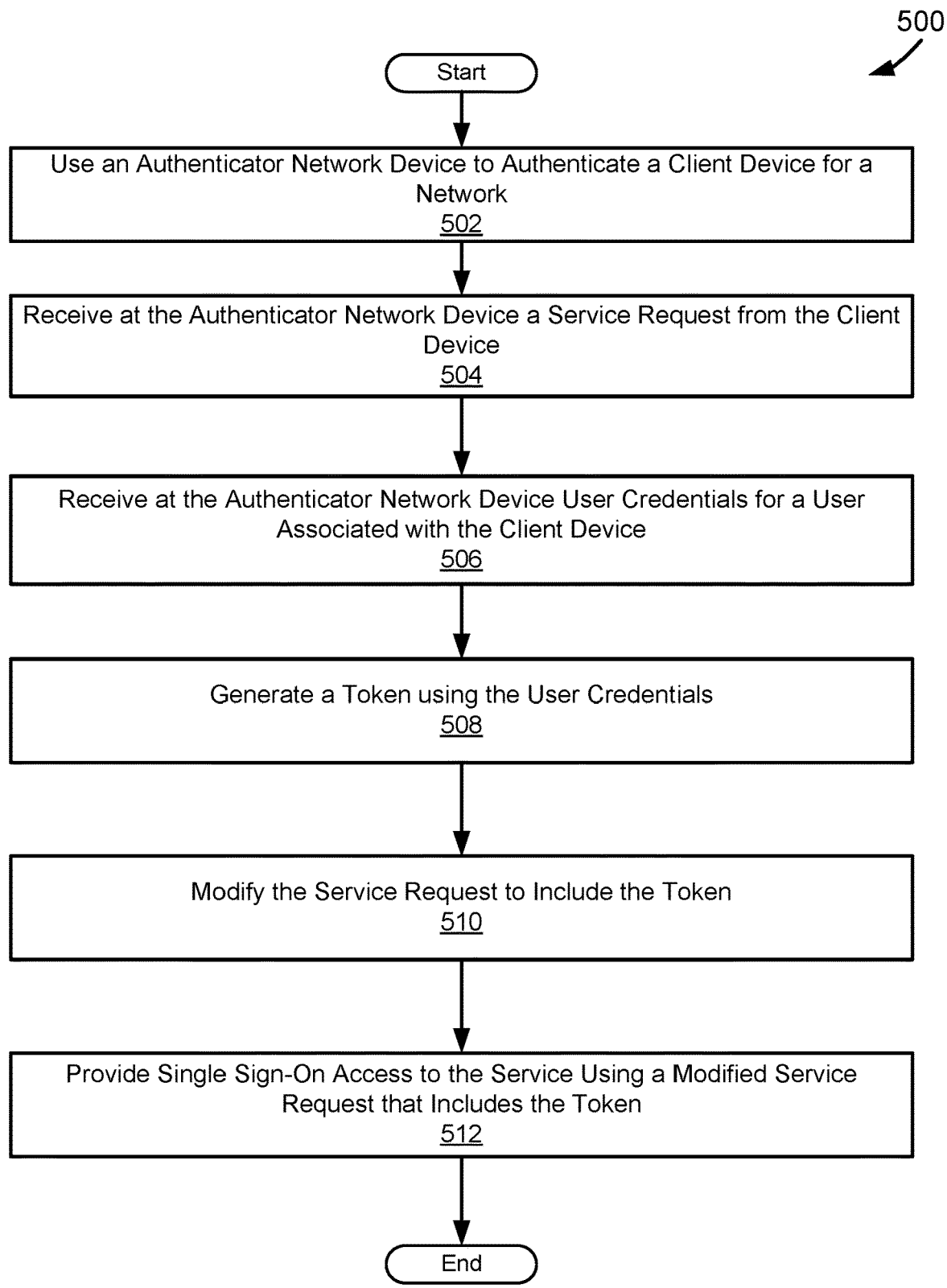
FIG. 5 depicts a flowchart of an example of a method for providing single sign-on access to a service to a client device.

In an example of operation of the example system shown in FIG. 4, the authenticator network device modifies service requests received from the client device to include a user token. In the example of operation, the authenticator network device 404 sends modified service requests to the user ID determination system 406. Further in the example of operation, the user key determination engine 410 functions to determine a user key of a user who initiated a service request modified by the authenticator network device 404 using a token included in the modified service request and user credential stored in the credential datastore 408. In the example of operation, the token decoding engine 412 decodes a token included in a modified service request. Additionally in the example of operation, the user ID determination engine 414 determines a user ID from a token decoded by the token decoding engine 412. In the example of operation, in determining a user ID from a token, the user ID determination engine decrypts a token decoded by the token decoding engine 412 to extract plain text that includes a nonce and a user ID. Further in the example of operation, the token validity determination engine 416 determines the validity of a token using a nonce included as part of extracted plain text from the token and a reference nonce included as user credentials stored in the credential datastore 408. In the example of operation, the FIG. 5 depicts a flowchart 500 of an example of a method for providing single sign-on access to a service to a client device. The example flowchart 500 begins at module 502, where a client device coupled to an authenticator network device is authorized for a network using, at least in part, the authenticator network device. In authenticating a client device for a network, the authenticator network device can transmit authentication data used to authenticate the client device for the network, between the client device and a network authentication system. Further, as part of authenticating a client device to a network, the authenticator network device can manage a port through which the client device is coupled to the authenticator network device. In managing a port through which a client device is coupled to the authenticator network device, the authenticator network device can set the port to either an authorized or an unauthorized state based on authentication data that is transmitted through the authenticator network device.

The example flowchart 500 shown in FIG. 5 continues to module 504, where the authenticator network device receives a service request from the client device coupled to the authenticator network device. A service request received by the authenticator network device from the client device can be an enrollment request that specifies a desire of a user of a client device to enroll in a service. A service request received by the authenticator network device from the client can be a use requests that specifies a desire of a user of a client device to use a service.

The example flowchart 500 shown in FIG. 5 continues to module 506, where the authenticator network device receives user credentials for a user associated with the client device. User credentials received by the authenticator network device can be for a user who initiated the service request received by the authenticator network device at module 504. The authenticator network device can receive user credentials form a device service management system after generating and sending a user credential query message to the device service management system. User credentials received at module 506 can include a user ID, a user key, and a nonce that are associated with and/or unique to a specific user. User credentials can be received at the authenticator network device in response to a user credential query message generated by the authenticator network device that includes a client device identifier, e.g. a MAC address of the client device.

The example flowchart 500 shown in FIG. 5 continues to module 508, where a token is generated, using user credentials received at module 506. A token can be generated at the authenticator network device after the user credentials are received at the authenticator network device. A token can be generated by generating plain text that includes a nonce and a user ID that is included as part of user credentials received by the authenticator network device. Plain text generated at part of generating a token can be encrypted and encoded to create the token. Plain text generate as part of generating a token can be encrypted using a user key included as part user credentials. A token can be generated that is associated with and/or unique to a specific user with user credentials that are used to generate the token.

The example flowchart 500 shown in FIG. 5 continues to module 510, where the service request is modified to include a token generated at module 508 to create a modified service request. The service request can be modified with a token that is specific to a user who initiated the service request. In generating a modified service request, a token can be inserted as a parameter in the service request to generate the modified service request. Depending upon implementation-specific or other considerations, in further generating a modified service request, a user ID of a user who initiated the service requests can be inserted into a parameter of the service request to create a modified service request.

The example flowchart 500 shown in FIG. 5 continues to module 512, where single sign-on access is provided to a user using a service request modified at module 510. In providing single sign-on access, a token included as a parameter in the modified service request can be decoded and decrypted to determine a nonce and a user ID from the modified service request. Depending upon implementation-specific or other considerations, a token included as part of a modified service request is decrypted using a user key unique to a user ID that is determined from a user ID included as a parameter in the modified service request. In providing single sign-on access, token validity is determined by comparing a nonce determined from a token with a reference nonce associated with a user ID included as part of the token and/or a user ID added as a parameter in the modified service request. If it is determined that a token is valid, then it can be determined that a user ID determined from the token is valid, and single sign-on access can be provided. Depending upon implementation-specific or other considerations, single sign-on access provided for by using a token in a modified service request can include either or both, single sign-on enrollment in a service and single sign-on use of the service.

Figure 6:
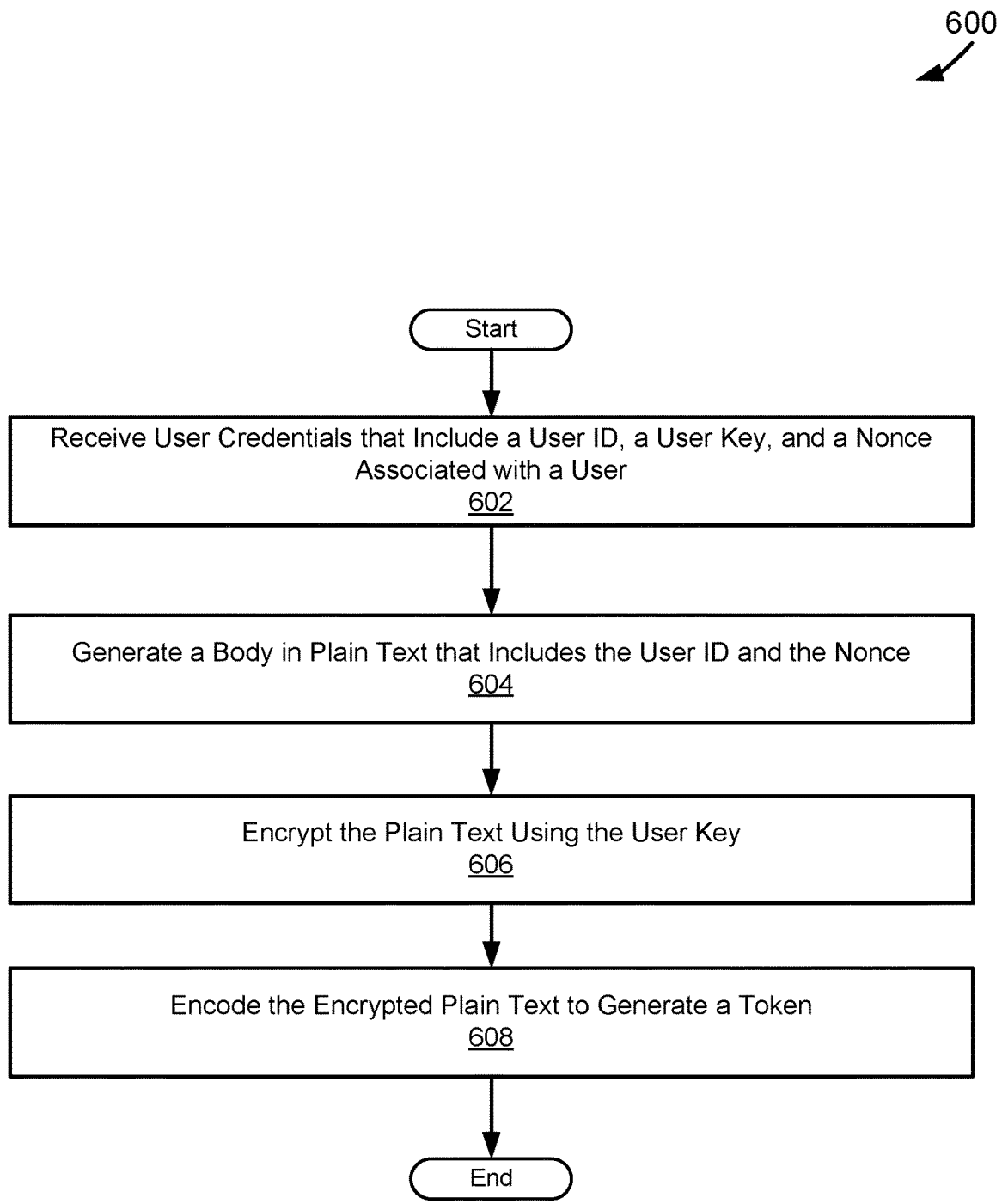
FIG. 6 depicts a flowchart of an example of a method for generating a token used in providing single sign-on access to services.

FIG. 6 depicts a flowchart 600 of an example of a method for generating a token used in providing single sign-on access to services. The example flowchart 600 shown in FIG. 6 begins at module 602, where user credentials are received. User credentials can be received at an authenticator network device in response to a user credential query message. Depending upon implementation-specific or other considerations, a user credential query message can be generated by an authenticator network device for a specific user who initiated a service request received from a client device coupled to the authenticator network device. Further depending upon implementation-specific or other considerations, user credentials can be received at the authenticator network device that are unique to a specific user who initiated a service request. User credentials received at module 602 can include a user ID, a user key, and a nonce associated with a user.

The example flowchart 600 shown in FIG. 6 continues to module 604, where a body in plain text is generated. A body in plain text generated at module 604 includes the user ID and the nonce included as part of user credentials received at module 602. Depending upon implementation-specific or other considerations, a user ID and nonce included as part of a body in plain text generated at module 604, can be unique to a specific user, such that the body in plain text generated at module 604 is unique to a specific user.

The example flowchart 600 shown in FIG. 6 continues to module 606, where a body in plain text is encrypted using a user key. A body in plain text can be encrypted using a user key that is included in user credentials that are used to generate the body in plain text. Depending upon implementation-specific or other considerations, a body in plain text can be encrypted using a user key that is unique to a user to which a user ID and nonce included in the plain text are also unique. At module 606, plain text can be encrypted using a use key according to an applicable encryption technique.

The example flowchart 600 shown in FIG. 6 continues to module 608, where plain text encrypted at module 606 is encoded to generate a token. Encrypted plain text can be encoded according to an applicable encoding technique, such as Base64. A resulting token can be added to a service request to generate a modified service request. Additionally, a resulting token can be used to provide single sign-on access to services that are the subject of service requests modified using the token.

Figure 7:
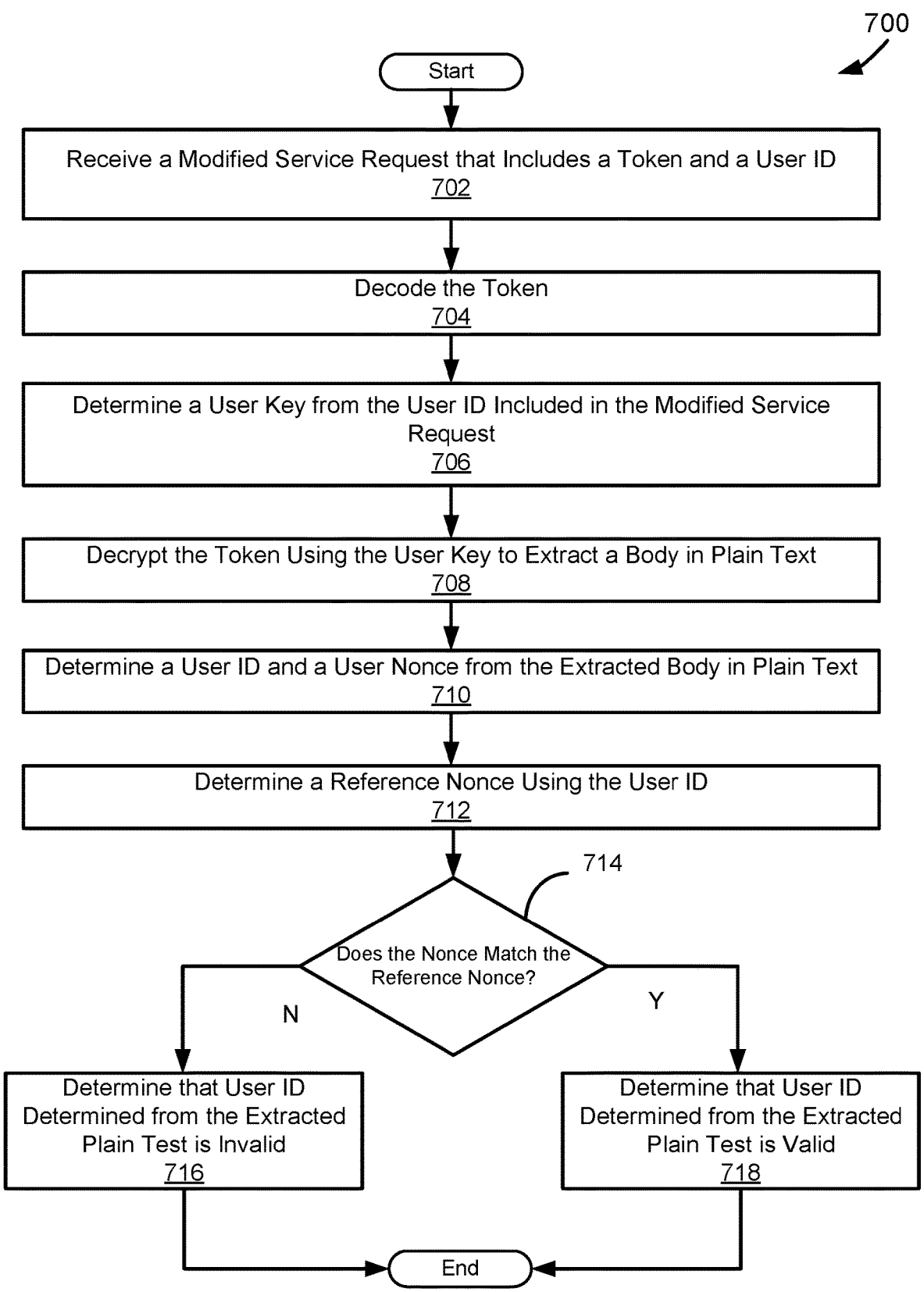
FIG. 7 depicts a flowchart of an example of a method for determining a user ID from a token included as part of a modified service request to provide single sign-on access to a service.

FIG. 7 depicts a flowchart 700 of an example of a method for determining a user ID from a token included as part of a modified service request to provide single sign-on access to a service. The example flowchart 700 shown in FIG. 7 begins at module 702, where a modified service request is received that includes a token and a user ID. A token and a user ID can be included as part of a modified service request as parameters of the modified service request. A modified service request that includes a token and a user ID as parameters can be received from an authenticator network device. A token included as part of a modified service request can be generated using applicable systems according to applicable techniques for generating a token, such as the systems and techniques described in this paper.

The example flowchart 700 shown in FIG. 7 continues to module 704, where the token included as part of the modified service request is decoded. The token included as part of a modified service request can be decoded using an applicable decoding technique, such as Base64.

The example flowchart 700 shown in FIG. 7 continues to module 706, where a user key is determined from the user ID included in the modified service request. A user key can be determined from a user ID that is included as a parameter in the modified service request. Depending upon implementation-specific or other considerations, a user key can be unique to a user that is uniquely associated with the user ID included in the modified service request.

The example flowchart 700 shown in FIG. 7 continues to module 708, where the token is decrypted using the user key to extract a body in plain text. The token is decrypted using the user key determined at module 706. In extracting plain text from the token, the token can be decrypted using the user key according to an applicable decryption technique.

The example flowchart 700 shown in FIG. 7 continues to module 710, where a user ID and a nonce are determined from the body of plain text extracted by decrypting the token at module 708. The plain text can be generated with a user ID and a nonce, such that the user ID and the nonce can be determined from the plain text after it is extracted from the token.

The example flowchart 700 shown in FIG. 7 continues to module 712 where a reference nonce is determined using a user ID. Depending upon implementation-specific or other considerations, a reference nonce can be determined using a user ID that is either or both included as a parameter in the modified service request, or determined from plain text extracted from the token. A reference nonce can be stored in an applicable datastore along with a user ID of a user that the reference nonce is associated. Depending upon implementation-specific or other considerations, a reference nonce can be unique to a user associated with a user ID that is used to determine the reference nonce.

The example flowchart 700 shown in FIG. 7 continues to decision point 714 where it is determined whether the nonce, determined from plain text extracted from the token, matches the reference nonce determined at module 712. If it is determined at decision point 714 that the nonce does not match the reference nonce determined at module 712, then the example flowchart 700 shown in FIG. 7 continues to module 716 where it is determined that the user ID determined from the extracted plain text is invalid, and therefore the token is invalid. In determining that a user ID is not valid, single sign-on access to a service is not provided to a user who initiated a request for the service. Depending upon implementation-specific or other considerations, if it is determined that a user ID is not valid, then a request for a new modified service request can be sent back to an authenticator network device in order to receive a modified service request with a valid token.

If at decision point 714, it is determined that the nonce, determined from plain text extracted from the token matches the reference nonce determined at module 712, then the example flowchart 700 shown in FIG. 7 continues to module 718. At module 718, it is determined that the user ID determined from plain text extracted from the token is valid, and therefore the token is valid. At module 718, where it is determined that the token is valid, then single sign-on access to a service that is the subject of the modified service request is provided. Depending upon implementation-specific or other considerations, single sign-on access to a service can include either or both single sign-on enrollment to the service and single sign-on use of the service.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method, comprising:
receiving, using an authenticator network device coupled to a client device via a port, a user ID associated with the client device to authenticate the client device to access a network service through a network;
receiving, at the authenticator network device, a service request to access the network service through the network;
generating, at the authenticator network device, a token specific to the user ID;
modifying, at the authenticator network device, the service request with the token to generate a modified service request;
providing the modified service request to a device service management system;
negotiating, via the authenticator network device, a second authentication method to authenticate the client device in response to rejection of a first authentication method by the client device, wherein the first authentication method is different from the second authentication method; and
setting the port to an authorized state in response to an indication that is based on the negotiated second authentication method and the user ID from the token in the modified service request, to authenticate the client device to allow use of the network service using the client device through the network by providing the single sign-on access to the network service without the user ID being provided as an input to access the network service.

2. The method of claim 1, further comprising:
receiving, at the authenticator network device, user credentials including a nonce;
generating, at the authenticator network device, the token using the nonce included as part of the user credentials; and
modifying, at the authenticator network device, the service request with the token generated using the nonce to generate the modified service request to authenticate the client device to use the network service using the client device through the network by providing the single sign-on access to the network service without the user ID being provided as an input to access the network service.

3. The method of claim 1, further comprising:
determining, from the user ID extracted from the token and an authorization table identifying network services, the client device is authorized to use the network service; and
based on the determination that the client device is authorized to use the network service, providing the network service to the client device through the network.

4. The method of claim 1, further comprising:
determining, from the user ID extracted from the token and an authorization table identifying network services, the client device is authorized to use the network service; and
based on the determination that the client device is authorized to use the network service, enrolling the client device to use the network service based on the token, the modified service request serving an as enrollment request for the client device in using the network service.

5. The method of claim 1, further comprising:
receiving, at the authenticator network device, user credentials including a nonce;
generating, at the authenticator network device, the token using the nonce included as part of the user credentials;
modifying, at the authenticator network device, the service request with the token generated using the nonce to generate the modified service request to determine if the token is valid; and
based on an indication that the token is valid, providing the network service to the client device through the network.

6. The method of claim 5, wherein determining whether the token is valid comprises comparing the nonce to a reference nonce associated with the user ID.

7. The method of claim 6, wherein the reference nonce is determined based on the user ID included in a user ID parameter of the token.

8. The method of claim 6, wherein the reference nonce is determined based on the user ID from a body in plain text extracted from the token.

9. The method of claim 1, wherein the modified service request includes a user ID parameter, the method further comprising:
determining a user key to decrypt the token from the user ID parameter.

10. The method of claim 1, further comprising:
generating a user credential query message that includes a client device identifier of the client device;
receiving, at the authenticator network device, user credentials including a nonce; and
generating, at the authenticator network device, the token specific to the user ID and the nonce received as part of the user credentials.

11. The method of claim 1, further comprising:
receiving, at the authenticator network device, another service request to access another network service through the network as part of accessing the network service through the network;

27 modifying, at the authenticator network device, the
another service request with the token to generate
another modified service request used in determining
whether to provide single sign-on access to the another
network service without the user ID being provided as
an input to access the another network service concurrently with accessing the network service; and providing the another modified service request to the
device service management system to determine the
user ID from the token in the another modified service
request to authenticate the client device to use the
another network service using the client device through
the network by providing the single sign-on access to
the another network service concurrently with providing access to the network service without the user ID
being provided as an input to access the network
service.

12. The method of claim 1, further comprising:
receiving, at the authenticator network device, user credentials for authenticating the client device to use the
network service by providing the single sign-on access
to the network service without the user ID being
provided as an input to access the network service; and
encrypting the modified service request using the user
credentials before providing the modified service
request to the device service management system.

13. A system, comprising:
an authenticator network device configured to:
receive, from a client device coupled to the authenticator
network device via a port, a user ID associated with the
client device to authenticate the client device to access
a network service through a network;
receive a service request to access the network service
through the network;
a token generation system configured to generate, at the
authenticator network device, a token specific to the
user ID;
a service request modification engine configured to:
modify, at the authenticator network device, the service
request with the token to generate a modified service
request;
provide the modified service request to a device service
management system;
a network authentication method determination engine
configured to negotiate a second authentication method
upon rejection of a first authentication method by the
client device for authenticating the client device,
wherein the first authentication method is different
from the second authentication method;
a service management engine configured to:
determine, at the device service management system, the
user ID from the token in the modified service request;
and
a port management engine configured to:
set the port to an authorized state in response to determining, at the device service management system and
based on the negotiated second authentication method
and the user ID from the token in the modified service
request, to authenticate the client device to allow use of
the network service using the client device through the
network by providing the single sign-on access to the
network service without the user ID being provided as
an input to access the network service.

14. The system of claim 13, further comprising:
a credential retrieval engine configured to receive, at the
authenticator network device, user credentials including a nonce;

28 the token generation system further configured to generate, at the authenticator network device, the token using
the nonce included as part of the user credentials;
the service request modification engine further configured
to modify, at the authenticator network device, the
service request with the token generated using the
nonce to generate the modified service request; and
the service management engine further configured to:
determine, at the device service management system,
the nonce from the modified service request to authenticate the client device to use the network service using
the client device through the network by providing the
single sign-on access to the network service without the
user ID being provided as an input to access the
network service.

15. The system of claim 13, wherein the service management engine is further configured to:
determine, from the user ID extracted from the token and
an authorization table identifying network services, the
client device is authorized to use the network service;
and
based on the determination that the client device is
authorized to use the network service, provide the
network service to the client device through the network.

16. The system of claim 13, wherein the service management engine is further configured to:
determine, from the user ID extracted from the token and
an authorization table identifying network services, the
client device is authorized to use the network service;
and
based on the determination that the client device is
authorized to use the network service, enroll the client
device to use the network service based on the token,
the modified service request serving as an enrollment
request for the client device in using the network
service.

17. The system of claim 13, further comprising:
a credential retrieval engine configured to receive, at the
authenticator network device, user credentials including a nonce;
the token generation system further configured to generate, at the authenticator network device, the token using
the nonce included as part of the user credentials;
the service request modification engine further configured
to modify, at the authenticator network device, the
service request with the token generated using the
nonce to generate the modified service request; and
the service management engine further configured to:
determine, at the device service management system, the
nonce and the user ID from the token to determine if the
token is valid; and
based on the determination that the token is valid, provide
the network service to the client device through the
network.

18. The system of claim 13, further comprising:
a credential retrieval engine configured to receive, at the
authenticator network device, user credentials including a nonce;
the token generation system further configured to generate, at the authenticator network device, the token using
the nonce included as part of the user credentials;
the service request modification engine further configured
to modify, at the authenticator network device, the
service request with the token generated using the
nonce to generate the modified service request; and wherein the service management engine is further configured to:
determine, at the device service management system, the nonce and the user ID from the token to determine if the token is valid by comparing the nonce to a reference nonce associated with the user ID;
based on the determination that the token is valid, provide the network service to the client device through the network.

19. The system of claim 13, wherein:
the authentication network device is further configured to receive another service request to access another network service through the network as part of accessing the network service through the network;
the service request modification engine is further configured to:
modify, at the authenticator network device, the another service request with the token to generate another modified service request used in determining whether to provide single sign-on access to the another network service without the user ID being provided as an input to access the another network service concurrently with accessing the network service;
provide the another modified service request to the device service management system; and
the service management engine is further configured to determine, at the device service management system, the user ID from the token in the another modified service request to authenticate the client device to use the another network service using the client device through the network by providing the single sign-on access to the another network service concurrently with providing access to the network service without the user ID being provided as an input to access the network service.

20. A non-transitory, tangible computer-readable media having instructions stored thereon that, when executed by at least one processor, causes the at least one processor to perform operations comprising:
receiving, using an authenticator network device coupled to a client device via a port, a user ID associated with the client device to authenticate the client device to access a network service through a network;
receiving a service request to access the network service through the network;
generating a token specific to the user ID;
modifying the service request with the token to generate a modified service request;
providing the modified service request to a device service management system;
authenticating, at the device service management system, the client device using a first authentication method;
negotiating, via the authenticator network device, a second authentication method upon rejection of the first authentication method by the client device to authenticate the client device, wherein the first authentication method is different from the second authentication method; and
setting the port to an authorized state in response an indication that is based on the negotiated second authentication method and the user ID from the token in the modified service request, to authenticate the client device to allow use of the network service using the client device through the network by providing the single sign-on access to the network service without the user ID being provided as an input to access the network service.

* * * * *